United States Patent
Park et al.

(10) Patent No.: US 9,043,149 B2
(45) Date of Patent: May 26, 2015

(54) METHOD AND APPARATUS FOR PERFORMING QUICK SEARCH OF PATH DISPLAY TERMINAL

(75) Inventors: Yong Kwan Park, Seoul (KR); Hyung Joon Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 1040 days.

(21) Appl. No.: 12/988,592

(22) PCT Filed: Apr. 22, 2009

(86) PCT No.: PCT/KR2009/002112
§ 371 (c)(1),
(2), (4) Date: Nov. 10, 2010

(87) PCT Pub. No.: WO2009/131383
PCT Pub. Date: Oct. 29, 2009

(65) Prior Publication Data
US 2011/0178700 A1    Jul. 21, 2011

(30) Foreign Application Priority Data

Apr. 24, 2008  (KR) .......................... 10-2008-0038239

(51) Int. Cl.
*G01C 21/34* (2006.01)
*G01C 21/36* (2006.01)
*G08G 1/0968* (2006.01)

(52) U.S. Cl.
CPC ...... *G01C 21/3611* (2013.01); *G08G 1/096894* (2013.01)

(58) Field of Classification Search
None
See application file for complete search history.

(56) References Cited

U.S. PATENT DOCUMENTS

| | | | | |
|---|---|---|---|---|
| 5,757,359 | A * | 5/1998 | Morimoto et al. | 345/156 |
| 6,006,161 | A * | 12/1999 | Katou | 701/410 |
| 6,067,502 | A * | 5/2000 | Hayashida et al. | 701/428 |
| 6,370,539 | B1 * | 4/2002 | Ashby et al. | 701/532 |
| 6,714,860 | B1 * | 3/2004 | Wawra et al. | 701/408 |
| 7,949,642 | B2 * | 5/2011 | Yang et al. | 707/706 |
| 2004/0017282 | A1 * | 1/2004 | Eguchi et al. | 340/425.5 |
| 2006/0025925 | A1 * | 2/2006 | Fushiki et al. | 701/210 |
| 2006/0139375 | A1 * | 6/2006 | Rasmussen et al. | 345/641 |
| 2006/0271281 | A1 * | 11/2006 | Ahn et al. | 701/208 |
| 2007/0061070 | A1 * | 3/2007 | Aoto | 701/209 |
| 2007/0236363 | A1 * | 10/2007 | Hamada et al. | 340/901 |
| 2008/0036626 | A1 * | 2/2008 | Kim | 340/995.14 |
| 2008/0086356 | A1 * | 4/2008 | Glassman et al. | 705/10 |
| 2008/0091657 | A1 * | 4/2008 | Yamazaki | 707/3 |
| 2008/0091689 | A1 * | 4/2008 | Mansikkaniemi | 707/100 |

(Continued)

FOREIGN PATENT DOCUMENTS

EP    1351174 A1 * 10/2003 ............. G06F 17/60
EP    1816438 A1    8/2007

(Continued)

*Primary Examiner* — Jonathan L Sample
(74) *Attorney, Agent, or Firm* — Fox Rothschild, LLP

(57) ABSTRACT

A method and apparatus for performing a quick search of a path display terminal are provided. The quick search device of a path display terminal comprises: a vehicle position display unit for displaying a position of a vehicle on a map generated based on map data; a quick search display unit for displaying a quick search area for inputting a search word in a portion of the map; a search unit for searching for a destination corresponding to the search word; and a path display unit for generating and displaying a path from the vehicle position to the destination.

18 Claims, 7 Drawing Sheets

(56) References Cited

U.S. PATENT DOCUMENTS

| | | | |
|---|---|---|---|
| 2008/0172367 A1* | 7/2008 | Igarashi | 707/3 |
| 2008/0244450 A1* | 10/2008 | Hisada et al. | 715/810 |
| 2008/0249701 A1* | 10/2008 | Zhuang | 701/200 |
| 2008/0319990 A1* | 12/2008 | Taranenko et al. | 707/5 |
| 2009/0018766 A1* | 1/2009 | Chen et al. | 701/202 |
| 2009/0083627 A1* | 3/2009 | Onda et al. | 715/708 |
| 2009/0150069 A1* | 6/2009 | Iao | 701/207 |
| 2009/0234572 A1* | 9/2009 | Matsuo et al. | 701/201 |
| 2010/0194783 A1* | 8/2010 | Kanamaru et al. | 345/660 |
| 2010/0289634 A1* | 11/2010 | Ikeda et al. | 340/441 |

FOREIGN PATENT DOCUMENTS

| | | | | | |
|---|---|---|---|---|---|
| JP | 2003-166843 | | 6/2003 | | |
| JP | 2003166843 | A * | 6/2003 | | G01C 21/00 |
| JP | 2005-345223 | | 12/2005 | | |
| JP | 2005345223 | A * | 12/2005 | | G01C 21/00 |
| JP | 2007-010498 | | 1/2007 | | |
| KR | 10-2008-0023566 | | 3/2008 | | |

* cited by examiner

METHOD AND APPARATUS FOR PERFORMING QUICK SEARCH OF PATH DISPLAY TERMINAL

CROSS-REFERENCE TO RELATED APPLICATIONS

This application is the National Stage of International Application No. PCT/KR2009/002112, filed on Apr. 22, 2009, which claims the Apr. 24, 2008 priority date of Korean Patent Application No. 10-2008-0038239. The contents of both applications are hereby incorporated by reference in their entirety.

BACKGROUND

1. Field

This document relates to a method and apparatus for performing a quick search of a path display terminal.

2. Related Art

As position tracking device related technology develops, a path display terminal for generating and displaying a path from a present position to a destination has been generally used. The path display terminal checks a position thereof generally using a global positioning system (GPS), generates an optimum path by searching for map information between the destination and the path display terminal position, and displays the generated path on a map. Further, even when a specific path is not displayed, the path display terminal displays a position of a vehicle in which the path display terminal is installed on the map, thereby allowing a user to view the vehicle position.

When the user tries to input the destination, a conventional path display terminal should convert a vehicle surrounding map screen displayed to the user to a destination input screen and thus whenever the user inputs an object word, the screen of the conventional path display terminal should be converted to the destination input screen. Further, until an input of a search word is terminated, the user cannot view a map around the vehicle.

Therefore, because a map around the vehicle can be displayed even while inputting a search word, a device or method that can search for the destination while checking a vehicle position at a segment in which movement of a vehicle is less, such as a traffic congestion segment is requested.

SUMMARY

An aspect of this document is to provide a method and device for performing a quick search of a path display terminal in which a user can input a destination while viewing a vehicle position and a map by displaying a quick search area in a portion on the map in which the vehicle position is displayed.

Another aspect of this document is to provide a method and device for performing a quick search of a path display terminal that can automatically select a search method when inputting a search word by displaying a search method to use to a user according to a format of a search word input to a quick search area.

Another aspect of this document is to provide a method and device for performing a quick search of a path display terminal that can prevent path related information from being hided by a quick search area by converting the quick search area to a quick search button when path connection information is displayed at the same position as that of the quick search area according to the advance of a path.

Another aspect of this document is to provide a method and device for performing a quick search of a path display terminal in which a user can view a wide range of map at one time by transparently forming a quick search area when a vehicle is driven in a speed difficult to input the destination.

In an aspect, there is provided a quick search device of a path display terminal comprising: a vehicle position display unit for displaying a position of a vehicle on a map generated based on map data; a quick search display unit for displaying a quick search area for inputting a search word to a portion of the map; a search unit for searching for a destination corresponding to the search word; and a path display unit for generating and displaying a path from the vehicle position to the destination.

The quick search device may further comprise a speed measurement unit for measuring a speed of the vehicle displayed in the vehicle position display unit, and if a speed of the vehicle measured in the speed measurement unit is larger than or equal to a reference speed, the quick search display unit may increase transparency of the quick search area.

If a search word is input in a designated format to the quick search area, the quick search display unit may display a search method corresponding to the designated format, and the search unit may search for the destination based on the search method.

When no designated format corresponding to the search word exists, the quick search display unit may receive an input of a search method, and the search unit may search for a destination based on a search method in which an input of the quick search display unit receives.

When a turn segment exists in the path, the path display unit may display lane information of a road corresponding to a position of the vehicle, distinguish a lane that can turn from other lanes in the lane information, and display the lane, and when the path display unit displays lane information, the quick search display unit may convert a quick search area to a quick search button and display the quick search button.

In another aspect, there is provided a method of performing a quick search of a path display terminal, the method comprising: displaying a position of a vehicle on a map generated based on map data; displaying a quick search area in a portion of the map; inputting a search word to the quick search area; searching for a destination corresponding to the search word; and generating a path from the vehicle position to the destination and displaying the path.

According to this document, by displaying a quick search area in a portion on a map in which a vehicle position is displayed, a user can input a destination while viewing the vehicle position and the map.

According to this document, by displaying a search method to use to a user according to a format of a search word input to a quick search area, when a search word is input, a search method can be automatically selected.

According to this document, when path related information is displayed at the same position as that of a quick search area according to the advance of a path, by converting a quick search area to a quick search button, it can be prevented that path related information is hided by the quick search area.

According to this document, when a vehicle is driven in a speed difficult to input the destination, by transparently forming a quick search area, a user can view a wide range of map at one time.

DETAILED DESCRIPTION

Hereinafter, various implementations of this document will be described in detail with reference to the attached drawings.

Figure 1:
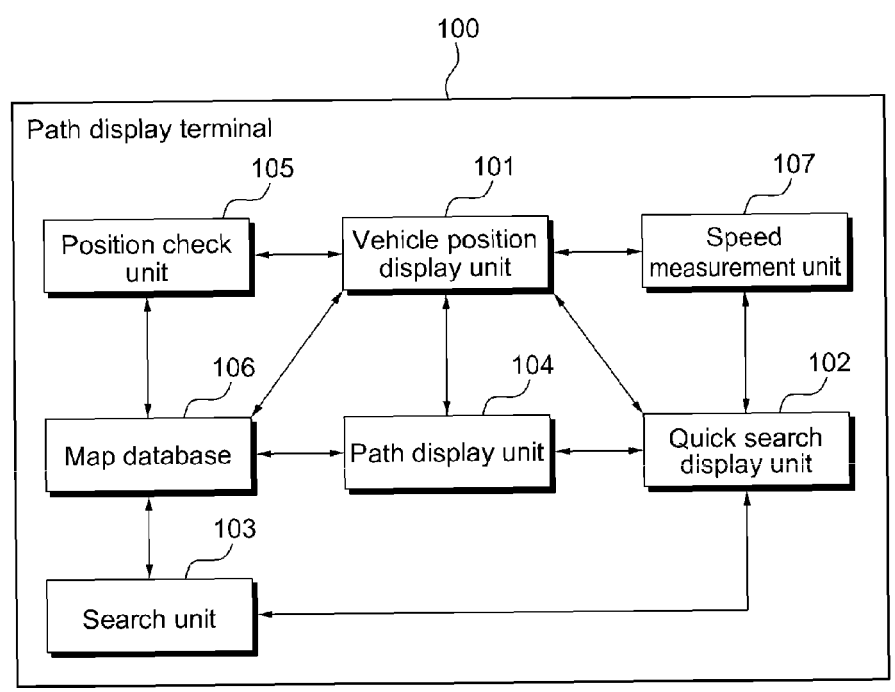
FIG. 1 a block diagram illustrating a configuration of a quick search apparatus of a path display terminal according to an implementation of this document.

FIG. 1 is a block diagram illustrating a configuration of a quick search apparatus of a path display terminal according to an implementation of this document.

A vehicle position display unit 101 displays a vehicle position on a map generated based on map data, and when a quick search display unit 102 displays a quick search area for receiving an input of a search word in a portion of the map, a search unit 103 searches for a destination corresponding to the search word, and a path display unit 104 generates and displays a path from the vehicle position to the destination.

The vehicle position display unit 101 requests map data within a predetermined distance from a vehicle position checked in a position check unit 105 to a map database 106, generates a map for displaying within a predetermined distance from the vehicle position based on map data received from the map database 106, and displays a vehicle at a point corresponding to a vehicle position on the generated map.

In this case, the quick search area displays in a line a window for inputting a search word and a search execution button.

A speed measurement unit 107 measures a vehicle speed displayed in the vehicle position display unit 101 and transmits the vehicle speed to the quick search display unit 102.

The speed measurement unit 107 is connected to a speedometer of the vehicle to measure the vehicle speed, and may calculate a vehicle speed with a distance in which the vehicle displayed in the vehicle position display unit 101 moves within a predetermined time period.

If a vehicle speed measured in the speed measurement unit 107 is larger than or equal to a reference speed, the quick search display unit 102 allows a user to view a map of a position in which the quick search area is displayed by increasing transparency of the quick search area.

At least one designated format, which is a format of a search word for using a specific search method is set to the quick search display unit 102, and when a search word is input in a designated format to the quick search area, the quick search display unit 102 displays a search method corresponding to the designated format and requests the search unit 103 to search for the destination based on the search method.

The designated format comprises numerals of a character row for using a title search method; numerals of a numeral row for using a phone number search method; and a specific word for using an address search method.

When the designated format corresponding to the search word does not exist, the quick search display unit 102 receives a search method input by a user and requests to search for the destination based on a search method input by the user to the search unit 103.

The search unit 103 searches for a destination corresponding to the search word according to a search method received from the quick search display unit 102 from the map database 106.

The path display unit 104 generates a path from a vehicle position to the destination in a vehicle position checked in the position check unit 105 and the destination found in the search unit 103 using general path line algorithm.

When a turn segment exists in the path, the path display unit 104 displays lane information of a road corresponding to the vehicle position and distinguishes a lane that can turn from other lanes in the lane information and displays the lane.

The quick search display unit 102 can convert a quick search area to a quick search button and display the quick search button. When the quick search button is selected, the quick search display unit 102 can convert a quick search button to a quick search area and display the quick search area.

Figure 2:
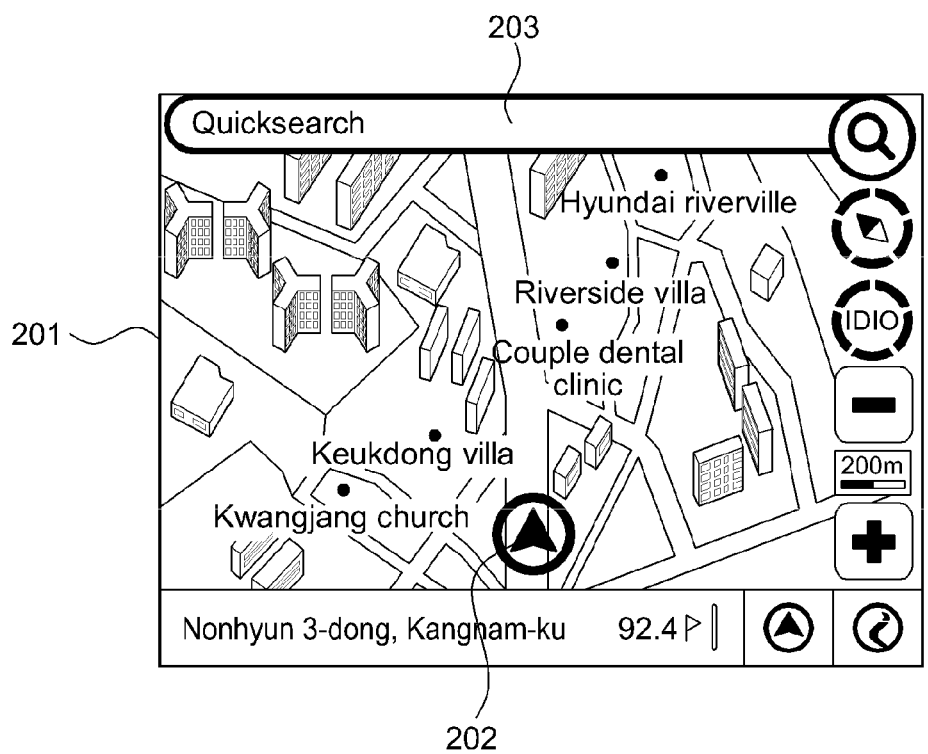
FIG. 2 illustrates an example of quick search area display of a path display terminal according to an implementation of this document.

FIG. 2 illustrates an example of quick search area display of a path display terminal according to an implementation of this document.

The vehicle position display unit 101 generates a map 201 for displaying within a predetermined distance from a vehicle position checked in the position check unit 105, and displays a vehicle 202 at a point corresponding to a vehicle position on the generated map. In this case, the quick search display unit 102 displays a quick search area 203 that can input a destination or a search word for searching for a destination in an upper part of the map 201.

In this way, according to an implementation of this document, by displaying a quick search area in a portion of a map, while displaying the map, a search word can be input.

Figure 3:
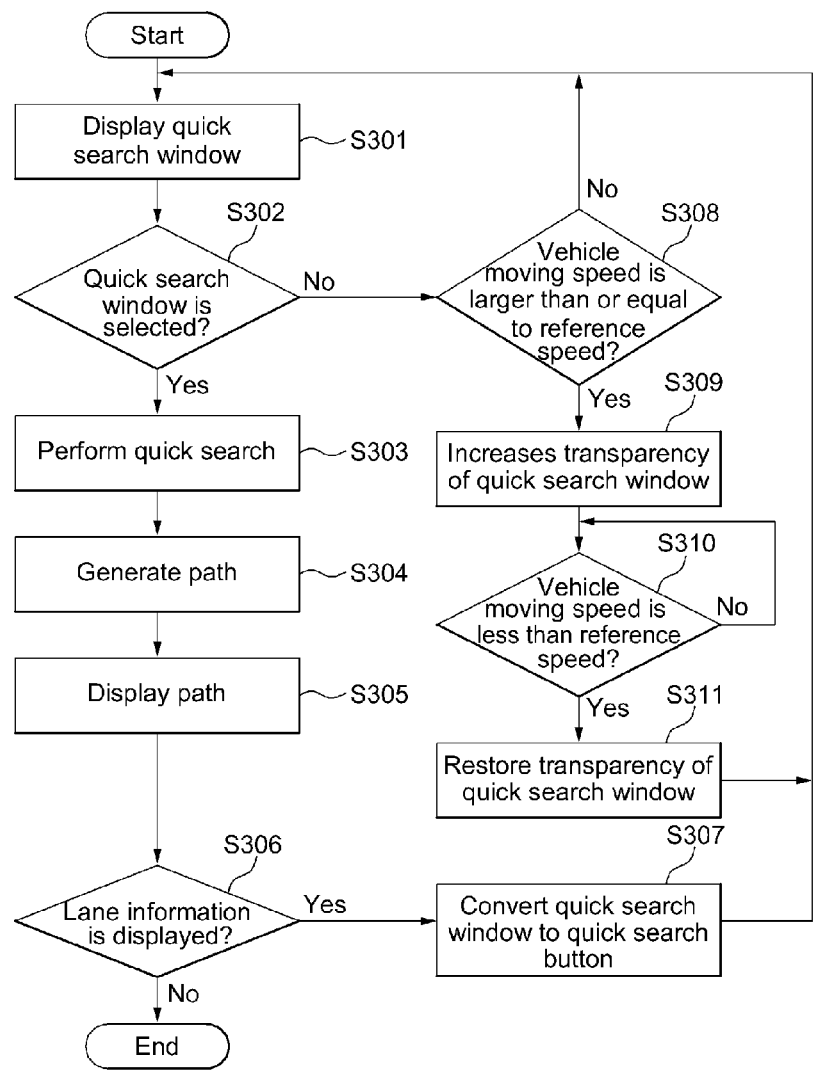
FIG. 3 is a flowchart illustrating a method of performing a quick search of a path display terminal according to an implementation of this document.

FIG. 3 is a flowchart illustrating a method of a performing a quick search of a path display terminal according to an implementation of this document.

The quick search display unit 102 displays a quick search area in a portion of a map in which the vehicle position display unit 101 generates based on map data (S301). In this case, a vehicle position checked by the position check unit 105 is displayed at the map.

In this case, the quick search display unit 102 displays in a line a quick search area in which a window for inputting a search word and a search execution button are formed.

The quick search display unit 102 determines whether the quick search area displayed at step S301 is selected (S302).

The quick search display unit 102 performs a quick search for allowing the search unit 103 to search for a destination corresponding to the search word by transmitting a search word input to the quick search area by a user to the search unit 103 (S303). The quick search will be described in detail with reference to FIG. 4.

The path display unit 104 generates a path from a vehicle position checked at step S301 to a destination found at step S303 (S304). In this case, the path display unit 104 can generate a path using general path line algorithm to the vehicle position and the destination.

The path display unit 104 displays the path generated at step S304 on the map displayed at step S301 (S305). In this case, when a turn segment exists in the path, the path display unit 104 displays lane information of a road corresponding to the vehicle position and distinguishes a lane that can turn from other lanes in the lane information and displays the lane.

The quick search display unit 102 determines whether lane information is displayed (S306).

The quick search display unit 102 converts the quick search area to the quick search button (S307). In this case, when the quick search button is selected, the quick search display unit 102 converts again the quick search button to the quick search area and displays the quick search area. In this case, the quick search display unit 102 transparently displays the quick search area, thereby preventing from being hided the lane information.

The quick search display unit 102 determines whether a vehicle moving speed is larger than or equal to a reference speed (S308). In this case, the speed measurement unit 107 measures the vehicle moving speed and transmits the vehicle moving speed to the quick search display unit 102, and the quick search display unit 102 compares the received vehicle moving speed with the reference speed and determines whether the received vehicle moving speed is larger than the reference speed. In this case, the reference speed may be a low speed of 11 km/h.

The quick search display unit 102 increases transparency of the quick search area displayed at step S301 (S309). In this case, the quick search display unit 102 converts transparency of a quick search area to 50%, thereby allowing a map of a portion in which a quick search area is positioned to pass through the quick search area and display on the quick search area.

The quick search display unit 102 determines whether the vehicle moving speed is less than the reference speed (S310). In this case, the quick search display unit 102 determines whether the vehicle moving speed larger than the reference speed is reduced to a speed less than the reference speed.

The quick search display unit 102 reduces transparency of the quick search area displayed at step S309 (S311). In this case, the quick search display unit 102 changes transparency of the quick search area to transparency of the quick search area displayed at step S301.

A method of performing a quick search of the checked path display terminal will be described in detail with reference to FIGS. 4, 5, 6, and 7.

Figure 4:
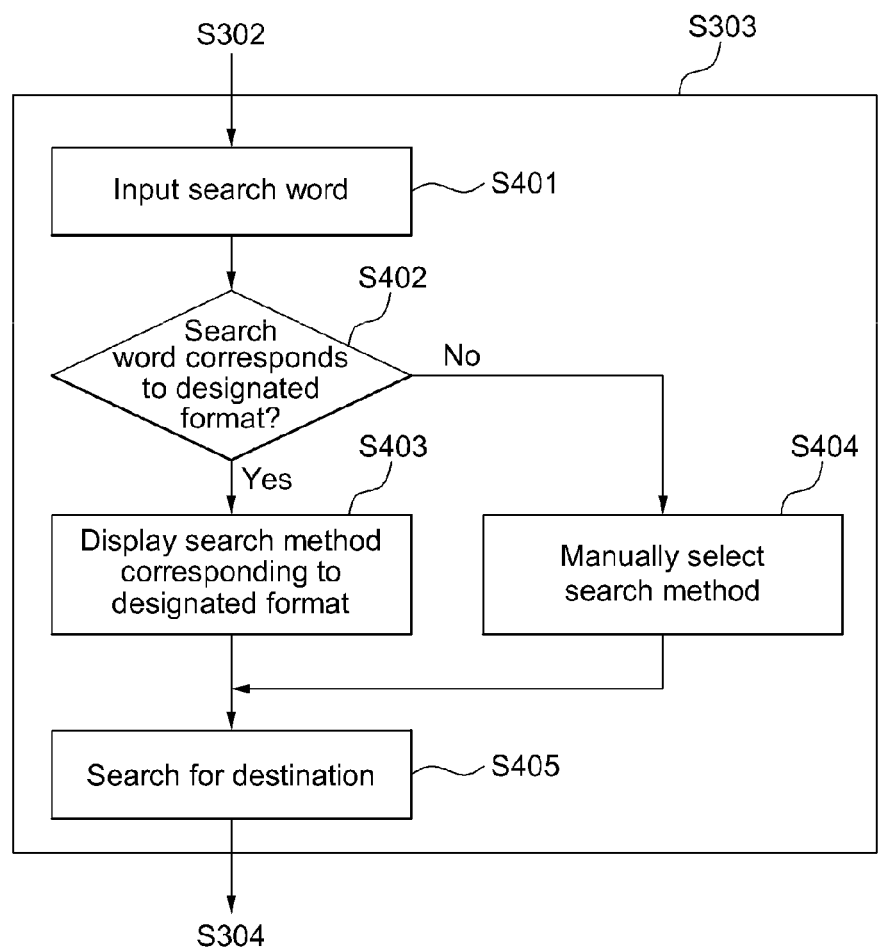
FIG. 4 is a flowchart illustrating a method of performing a quick search according to an implementation of this document.

FIG. 4 is a flowchart illustrating a method of performing a quick search according to an implementation of this document. Here, as shown in FIG. 4, steps S401 to S405 may be comprised at step S303 described with reference to FIG. 3.

The quick search display unit 102 receives an input of a character row, a numeral row, or a combination of a character row and a numeral row as a search word on a quick search area (S401).

The quick search display unit 102 determines whether the search word input at step S401 is a search word corresponding to a designated format (S402). In this case, when a character row or a numeral row corresponding to a designated format, which is a form (numerals of a character row, numerals of a numeral row, and a specific word) of a search word for using a specific search method is comprised in the search word, the quick search display unit 102 determines the search word as a search word corresponding to a designated format.

The quick search display unit 102 displays a search method corresponding to a designated format checked at step S402 and transmits the search method and the search word to the search unit 103 (S403). In this case, the quick search display unit 102 displays a search method corresponding to the designated format using a search method toggle in the quick search area.

The quick search display unit 102 receives an input of a search method to use for the search from a user and transmits the received search method and search word to the search unit 103 (S404). In this case, the quick search display unit 102 displays a search method toggle in the quick search area, and when the search method toggle is selected, the quick search display unit 102 displays a list of search methods that can use for the search and thus allows the user to select the search method.

The search unit 103 searches for and displays the destination in the map database 106 based on a search method and a search word received at step S403 or S404 (S405).

Figure 5:
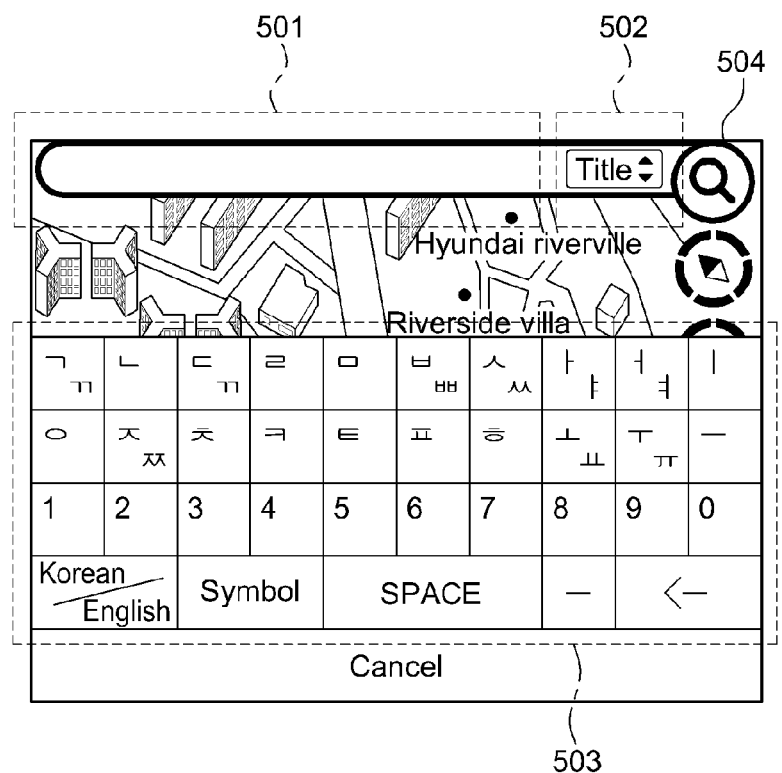
FIG. 5 illustrates an example of a screen displayed in a quick search process according to an implementation of this document.

FIG. 5 illustrates an example of a screen displayed in a quick search process according to an implementation of this document.

The quick search display unit 102 displays a search word window 501 in which the input character row or numeral row is displayed when a quick search area is selected, a search method toggle 502 in which a search method is displayed, an input device 503 for selecting and inputting a character row or a numeral row to display in the search word window 501, and a search button 504 for performing a search.

In this case, when 10 or 11 adjacent digit numerals are set to a designated format to correspond to a phone number search method, if a numeral row such as 010xx10x1x0 is input to the search word window 501 through the input device 503, the quick search display unit 102 displays a phone number in the search method toggle 502, and when the search button 504 is selected, the quick search display unit 102 allows the search unit 103 to search for an address corresponding to a phone number of 010xx10x1x0.

In this case, the search method toggle 502 displays one of a search method that can use in the search unit 103 and a content requesting an input of a search method.

In this case, when a character row or a numeral row input to the search word window 501 through the input device 503 does not exist in a designated format, the quick search display unit 102 displays a content requesting an input of a search method in the search method toggle 502 and allows a user to convert a content displayed in the search method toggle 502 and to input a desired search method.

In this way, when a quick search is used according to an implementation of this document, by displaying a search method to use to a user according to a format of a search word input to the quick search area, when inputting a search word, a search method can be automatically selected and the user may select a search method, as needed.

Figure 6:
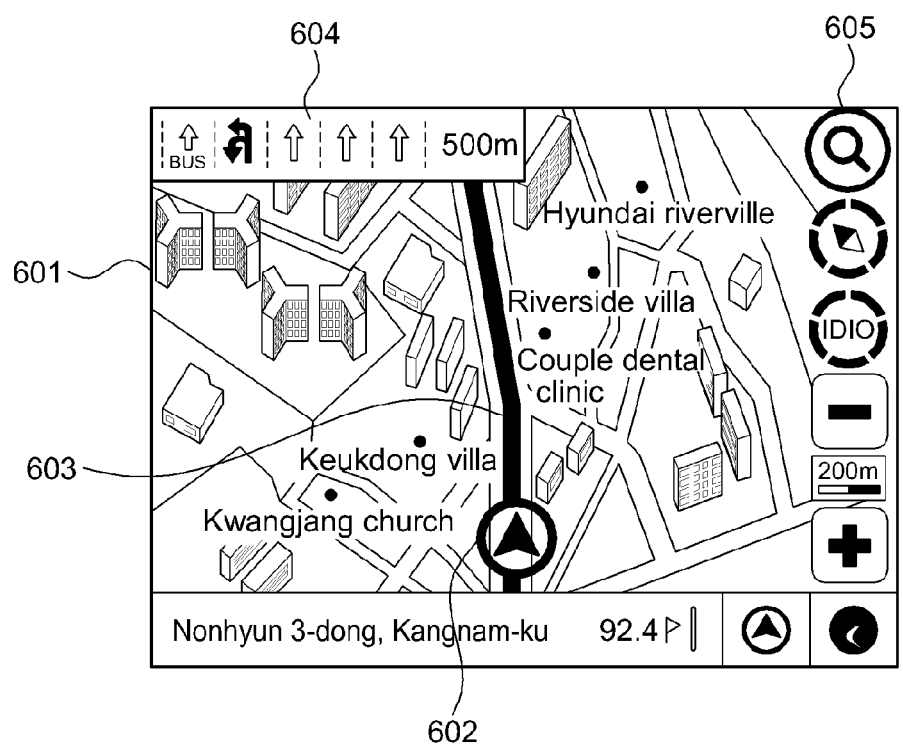
FIG. 6 illustrates an example of a screen displayed when a quick search area is converted to a quick search button according to an implementation of this document.

FIG. 6 illustrates an example of a screen displayed when a quick search area is converted to a quick search button according to an implementation of this document.

The vehicle position display unit 101 generates a map 601 for displaying within a predetermined distance from a vehicle position checked in the position check unit 105 and displays a vehicle 602 at a point corresponding to the vehicle position on the generated map. In this case, the path display unit 104 generates a path 603 from the vehicle 602 to the destination and displays the path 603 in the map 601, and when a turn segment exists in the path 603 within a predetermined distance, the path display unit 104 displays a lane of a road at which the vehicle 602 is positioned and lane information 604 in which a color of a lane that can turn is displayed differently from those of other lanes.

In this case, the quick search display unit 102 converts a quick search area that can input the destination or a search word for searching for the destination to a quick search button 605 and displays the quick search button 605, thereby preventing the quick search area from being overlapped with the lane information 604.

In this way, according to an implementation of this document, when using a quick search area, if path related information is displayed at the same position as that of a quick search area according to the advance of a path, by converting the quick search area to the quick search button, it can be prevented that path related information is hided by the quick search area.

Figure 7:
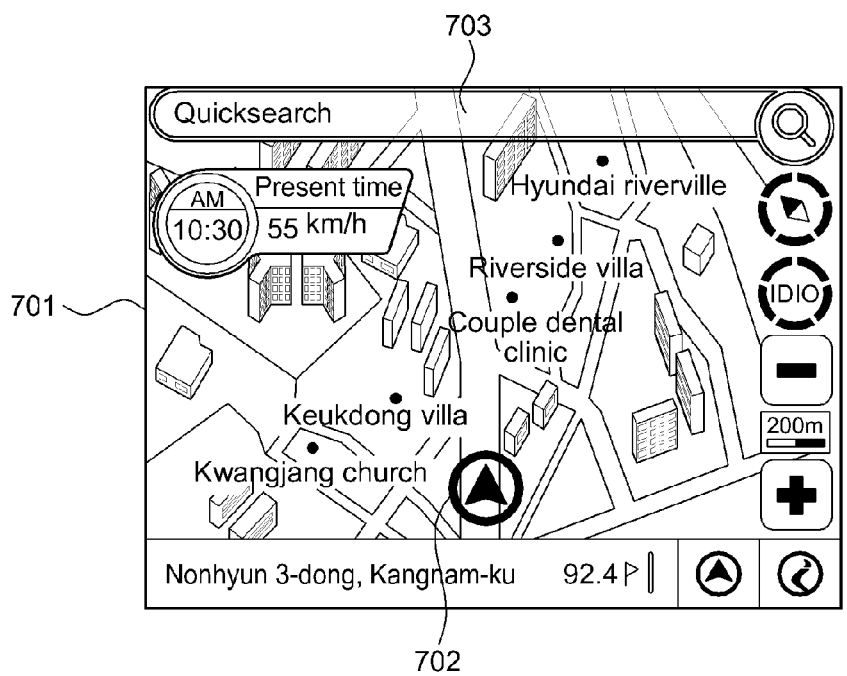
FIG. 7 illustrates an example of a screen displayed when a vehicle is driven in a reference speed or more according to an implementation of this document.

FIG. 7 illustrates an example of a screen displayed when a vehicle is driven in a reference speed or more according to an implementation of this document.

The vehicle position display unit 101 generates a map 701 for displaying within a predetermined distance from a vehicle position checked in the position check unit 105 and displays a vehicle 702 at a point corresponding to a vehicle position of the generated map. In this case, if a vehicle moving speed transmitted from the speed measurement unit 107 is larger than the reference speed, the quick search display unit 102 translucently forms a quick search area 703 by increasing transparency of the quick search area 703, thereby displaying the map 701 of a point at which the quick search area 703 is positioned through the quick search area 703.

In this way, according to an implementation of this document, when using a quick search area, if a vehicle is driven in a speed difficult to input the destination, by transparently forming the quick search area, a user can view a wide range of map at one time.

Implementations according to this document are embodied in a program instruction form that can be performed through various computer means and are recorded in a computer readable medium. The computer readable medium may comprise a program instruction, file data, and a data structure, or a combination thereof. A program instruction recorded in the medium may be particularly designed and formed for this document or may be well known to a person of ordinary skill in the computer software art and be used. The computer readable medium comprises, for example, a hardware device particularly formed to store and execute a program instruction, such as magnetic media such as a hard disk, a floppy disk, and a magnetic tape, optical media such as a CD-ROM and a DVD, magneto-optical media such as a floptical disk, and a ROM, a RAM, and a flash memory. An example of a program instruction comprises a high-level language code that can be executed by a computer using an interpreter, etc., as well as a machine language code formed by a compiler. The above-described hardware device can be formed to operate as at least one software module in order to perform operation of this document, or vice versa.

This document has been particularly shown and described with reference to implementations thereof, it will be understood by those skilled in the art that various changes in form and details may be made therein without departing from the spirit and scope of this document as defined by the appended claims.

While this document has been described in connection with what is presently considered to be practical implementations, it is to be understood that this document is not limited to the disclosed implementations, but, on the contrary, is intended to cover various modifications and equivalent arrangements comprised within the spirit and scope of the appended claims.

What is claimed is:

1. A quick search device of a path display terminal, said device comprising a position display unit for displaying a position of the path display terminal on a map generated based on map data, a quick search display unit for displaying a quick search area for inputting a search word in a portion of the map,
   a search unit for searching for a destination corresponding to the search word,
   a path display unit for generating and
   displaying a path from the position of the path display terminal to the destination, and
   a speed measurement unit for measuring a moving speed of the path display terminal, wherein the quick search display unit changes transparency to allow the portion of the map, on which the quick search area is positioned, to be seen through the quick search area in correspondence to a moving speed of the path display terminal measured in the speed measurement unit.

2. The quick search device of claim 1, wherein the quick search area displays, along a line, a window for inputting a search word and a search execution button.

3. The quick search device of claim 1,
   wherein if a moving speed of the path display terminal measured in the speed measurement unit is larger than or equal to a reference speed, the quick search display unit increases transparency of the quick search area, and if the moving speed of the path display terminal measured in the speed measurement unit is less than a reference speed, the quick search display unit decreases transparency of the quick search area.

4. The quick search device of claim 1, wherein if a search word is input in a designated format to the quick search area, the quick search display unit displays a search method corresponding to the designated format, and the search unit searches for the destination based on the search method.

5. The quick search device of claim 4, wherein the designated format comprises: numerals of a character row for using a title search method; numerals of a numeral row for using a phone number search method; and a specific word for using an address search method.

6. The quick search device of claim 4, wherein when the designated format corresponding to the search word does not exist, the quick search display unit receives an input of a search method, and the search unit searches for a destination based on a search method in which the quick search display unit receives.

7. The quick search device of claim 6, wherein the quick search display unit displays a search method corresponding to the designated format and receives an input of a search method using a search method toggle that can select a search method when the search method is selected.

8. The quick search device of claim 2, wherein when a turn segment exists in the path, the path display unit displays lane information of a road corresponding to a position of the path display terminal and distinguishes a lane that can turn from other lanes in the lane information and displays the lane.

9. The quick search device of claim 8, wherein when the path display unit displays lane information, the quick search display unit converts a quick search area to a quick search button and displays the quick search button.

10. A method of performing a quick search of a path display terminal, the method comprising:
   displaying a position of the path display terminal on a map generated based on map data;
   displaying a quick search area in a portion of the map;
   inputting a search word to the quick search area;
   searching for a destination corresponding to the search word;
   generating a path from the position of the path display terminal to the destination and displaying the path;

measuring a moving speed of the path display terminal; and
changing transparency to allow the portion of the map, on which the quick search area is positioned, to be seen through the quick search area in correspondence to the measured moving speed of the path display terminal.

11. The method of claim 10, wherein the quick search area displays, along a line, a window for inputting a search word and a search execution button.

12. The method of claim 10, wherein the changing of transparency of the quick search area comprises increasing, if a moving speed of the path display terminal is larger than or equal to a reference speed, transparency of the quick search area and decreasing, if a moving speed of the path display terminal is less than a reference speed, transparency of the quick search area.

13. The method of claim 10, wherein the searching for of a destination comprises: determining whether a search word is input in a designated format to the quick search area; displaying a search method corresponding to the designated format; and searching for the destination based on the search method.

14. The method of claim 13, wherein the designated format comprises:
numerals of a character row for using a title search method; numerals of a numeral row for using a phone number search method; and a specific word for using an address search method.

15. The method of claim 13, wherein the searching for of the destination further comprises: receiving an input of a search method; and searching for the destination based on the received search method.

16. The method of claim 15, wherein the receiving of an input of a search method comprises: displaying a search method corresponding to the designated format; and receiving, when the search method is selected, an input of the search method using a search method toggle that can select the search method.

17. The method of claim 10, wherein the generating a path from the position of the path display terminal to the destination and displaying the path comprises displaying, when a turn segment exists in the path, lane information of a road corresponding to a position of the path display terminal and distinguishing a lane that can turn from other lanes in the lane information and displaying the lane.

18. The method of claim 17, wherein the displaying of a quick search area in a portion of the map comprises converting, when lane information is displayed on the map, the quick search area to a quick search button and displaying the quick search button.

* * * * *